(12) United States Patent
Kwong

(10) Patent No.: US 8,195,127 B1
(45) Date of Patent: Jun. 5, 2012

(54) SYSTEMS AND METHODS FOR PROTECTING EMAILS

(76) Inventor: Yat Wai Edwin Kwong, Hong Kong (HK)

( * ) Notice: Subject to any disclaimer, the term of this patent is extended or adjusted under 35 U.S.C. 154(b) by 0 days.

(21) Appl. No.: 13/015,824

(22) Filed: Jan. 28, 2011

(51) Int. Cl.
*H04M 1/66* (2006.01)
*H04M 1/725* (2006.01)
*H04W 24/00* (2009.01)

(52) U.S. Cl. .................... 455/411; 455/412.1; 455/456.1

(58) Field of Classification Search .................. 455/411, 455/412.1, 456
See application file for complete search history.

(56) References Cited

U.S. PATENT DOCUMENTS

| | | | | |
|---|---|---|---|---|
| 2007/0249322 | A1* | 10/2007 | Benco et al. | 455/410 |
| 2007/0298786 | A1* | 12/2007 | Meyers et al. | 455/431 |
| 2011/0212706 | A1* | 9/2011 | Uusilehto | 455/411 |

FOREIGN PATENT DOCUMENTS

| | | |
|---|---|---|
| CN | 101031924 A | 9/2007 |
| CN | 101604014 A | 10/2007 |
| CN | 201131030 A | 10/2008 |
| TW | 271985 A | 1/2007 |

\* cited by examiner

*Primary Examiner* — Erika Gary
*Assistant Examiner* — Michael Mapa

(57) ABSTRACT

Systems and methods are provided for protecting email messages. In accordance with one implementation, a phone is provided that includes allowing users to protect the users' emails in mobile devices from tampering by third parties, if the mobile devices are lost to the third parties. In addition, the phone may be configured to apply electronic maps to divide locations into different regions. Moreover, the phone may be configured to erase emails either temporarily or permanently, when certain conditions occur.

8 Claims, 2 Drawing Sheets

SYSTEMS AND METHODS FOR PROTECTING EMAILS

BACKGROUND

I. Technical Field

The present invention generally relates to the field of protecting email messages. Specifically, and without limitation, the invention relates to allowing users to protect the users' emails in mobile devices from tampering by third parties, if the mobile devices are lost to the third parties.

II. Background Information

Email systems are relied by virtually every major business around the world. Content found in email systems may contain personal as well as confidential information that are extremely valuable to a company. When an employee's emails are disclosed to third parties, any confidential information may be leaked to the outside world and thus harm the company. With mobile handset devices gaining popularity, it is increasingly common for employees to store email information in such devices. Not, however, a lot of cautious measures have been paid by both employees and companies regarding the safety measures with protecting the contents stored in these devices. When a user carrying mobile devices enters into an area that is restricted by the user's company, would the user's emails in the devices be lost easily? Additionally, what if a user's mobile device is lost to a third party by accident? Should extra protection be paid by the user's company to adopt preventive measures against stolen or lost mobile devices? This invention is intended to reduce the impact brought by such problems.

In view of the foregoing, there is a need for phones that protect email messages of corporate users. There is also a need for phones that can restrict how email messages should be controlled when mobile devices of corporate users are lost.

Embodiments of the present invention relate to phones for protecting email messages. Certain embodiments of the invention include a mobile phone that comprises a processor, and a memory. The mobile phone is configured to allow provisioning of a safety feature that operates totally independent of a carrier's control. The memory stores instructions to be executed by the processor.

The instructions comprise receiving an instruction from a user to enable a safety feature, wherein the user is an end user of a mobile phone whose network coverage from a phone carrier includes a geographic area such as a country or a state; disabling data connection with the carrier, for security reasons; requesting the user for information for enabling a safety feature that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area.

In the embodiments, the instructions may further comprise receiving an answer from the user, wherein the answer includes the sub-geographic region; the sub-sub-geographic region; the building; the floor of the building; the embassy; and the open area. In addition, after receiving an answer from the user, the instructions further comprise enabling the safety feature in view of the received answer.

Further, the instructions comprise re-enabling data connection with the carrier, after setting up the safety feature; after the mobile phone entering the sub-geographic region labeled as the dangerous reception area by a third party unknown to the user, detecting current location being the dangerous reception area by a location-identification device included physically in the mobile phone.

Alternatively, after the mobile phone entering the sub-geographic region labeled as the dangerous reception area, the mobile phone may be configured to detect of the phone is being carried by a third party unknown to the user. The phone may be configured to detect current location being the dangerous reception area by a location-identification device included physically in the mobile phone; erasing all emails currently stored in the mobile phone; and all contacts currently stored in the mobile phone; after leaving the sub-geographic region labeled as the dangerous reception area by the third party unknown to the user, detecting current location being the safe reception area by the location-identification device included physically in the mobile phone; and allowing the third party to use the mobile phone with an empty set of email inbox and an empty set of contact list.

In yet a different embodiment, the inventive phone may erase all emails currently stored in the mobile phone, and all contacts currently stored in the mobile phone. After leaving the sub-geographic region labeled as the dangerous reception area by the third party unknown to the user, the phone may further detect current location being the safe reception area by the location-identification device included physically in the mobile phone; and allow the third party to use the mobile phone with an empty set of email inbox and an empty set of contact list.

Even further, after the emails are erased, they can be restored. In a different embodiment, the phone may comprise steps restoring the emails to the mobile phone; and the contacts to the mobile phone; and allowing the user to use the mobile phone with a complete set of email inbox and a complete set of contact list.

In yet a different embodiment, the phone may be configure to alert the carrier to report that a third party has entered the very dangerous reception area. Further, the phone may request the carrier to determine whether all emails currently stored in the mobile phone should be erased permanently; and all contacts currently stored in the mobile phone should be erased permanently. If allowed by the carrier, the phone may erase all emails currently stored in the mobile phone permanently; all contacts currently stored in the mobile phone permanently; all emails currently stored in the carrier permanently. Alternatively, the removal of the emails may be temporarily, in that they can be restored later on.

It is to be understood that both the foregoing general description and the following detailed description are exemplary and explanatory only, and are not restrictive of the scope of the invention, described and as claimed. Furthermore, features and variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
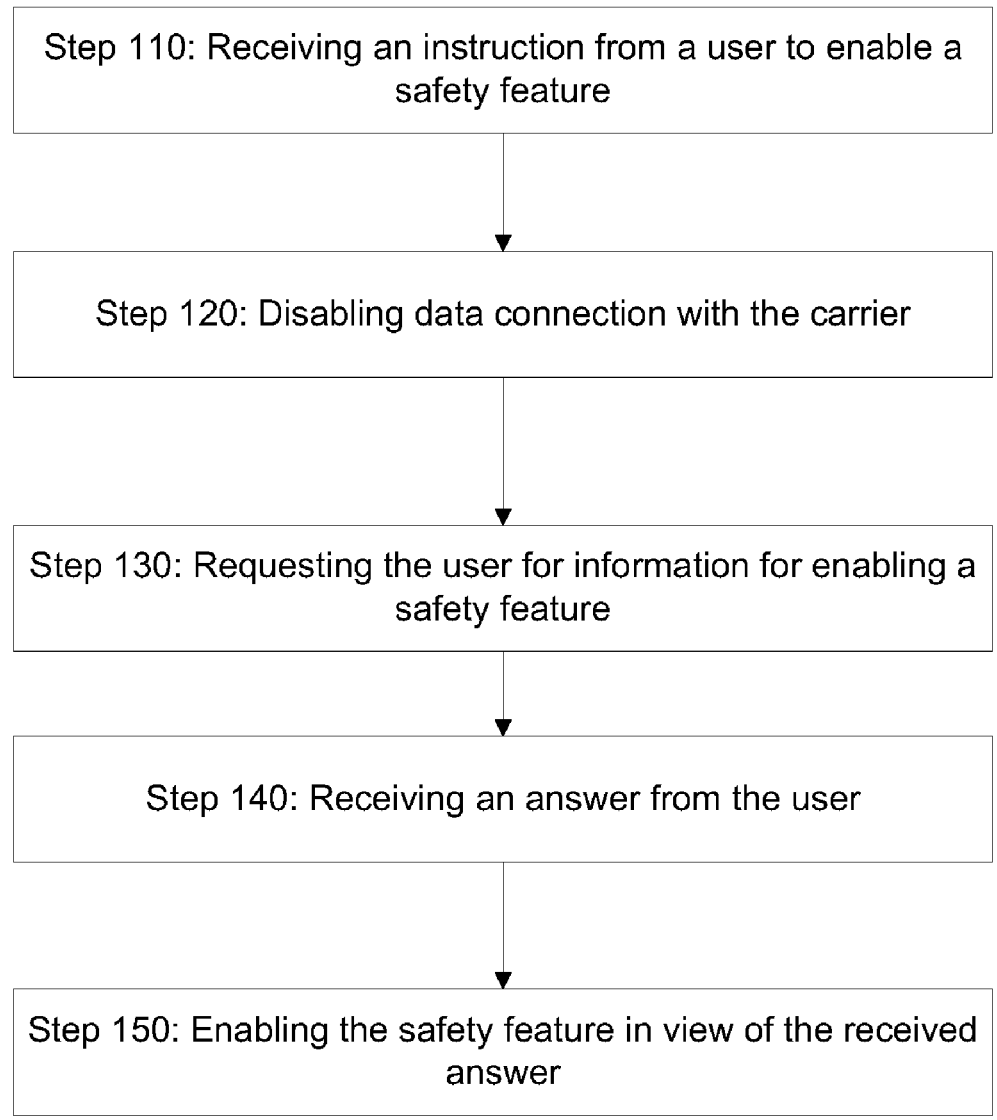
FIG. 1 is a flow diagram illustrating an exemplary system, consistent with an embodiment of the present invention.
Figure 2:
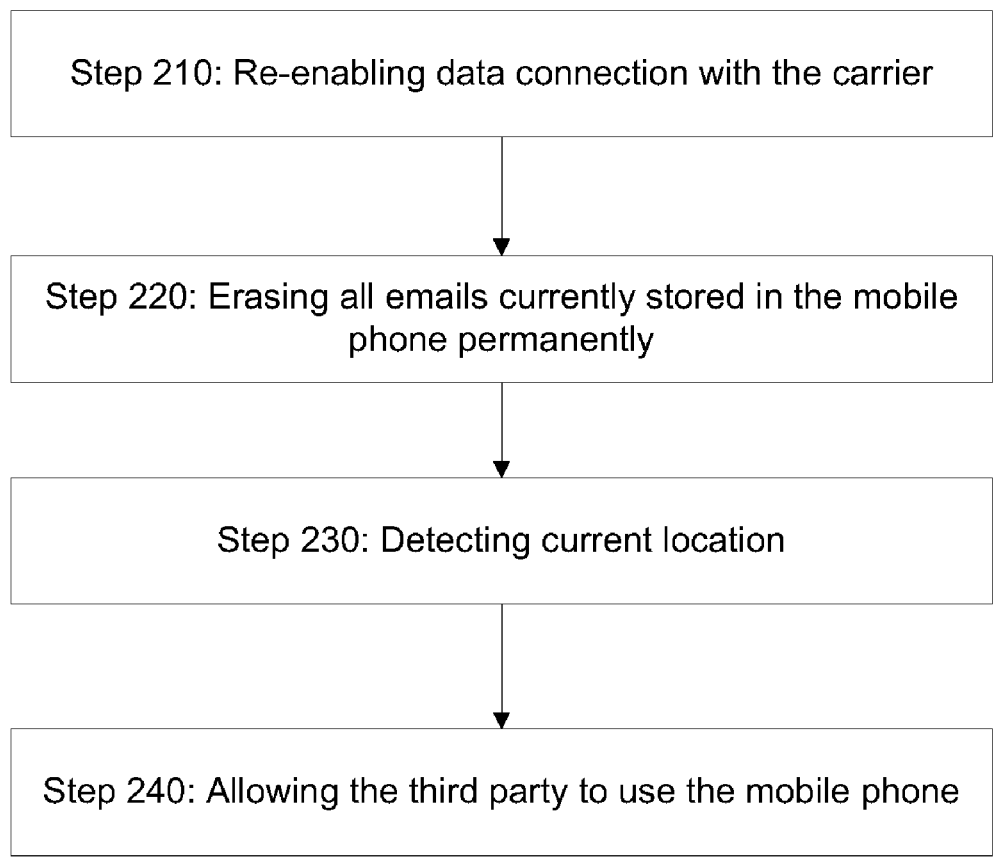
FIG. 2 is a flow diagram illustrating erasing emails and contacts, consistent with an embodiment of the present invention.

Embodiments include phones that allow provisioning of a safety feature that operates totally independent of a carrier's control. In one embodiment, for example, a mobile phone is provided. In FIG. 1, the mobile phone is disclosed. It includes a processor; and a memory storing instructions to be executed by the processor. The instructions include receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area.

The building may be labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area; receiving an answer from the user, (step 140) wherein the answer includes the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the sub-geographic region labeled as the dangerous reception area by a third party unknown to the user, detecting current location (step 230) (step 220) being the dangerous reception area by a location-identification device included physically in the mobile phone; erasing all emails currently stored in the mobile phone; and all contacts currently stored in the mobile phone; after leaving the sub-geographic region labeled as the dangerous reception area by the third party unknown to the user, detecting current location (step 230) (step 220) being the safe reception area by the location-identification device included physically in the mobile phone; and allowing the third party to use the mobile phone (step 240) with an empty set of email inbox and an empty set of contact list.

The mobile phone may be implemented with slight variations of existing features. For example, the mobile phone may be configured to allow provisioning of a safety feature that operates totally independent of a carrier's control, comprising a processor; and a memory storing instructions to be executed by the processor, wherein the instructions comprise receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; a floor of the building.

The floor may be labeled as a safe reception area; an embassy building that is within the geographic area, wherein the embassy building is labeled as an extreme dangerous reception area; and an open area within the embassy, wherein the open area is labeled as a safe reception area; receiving an answer from the user, (step 140) wherein the answer includes the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the sub-geographic region labeled as the dangerous reception area by the user, detecting current location (step 230) (step 220) being the dangerous reception area by a location-identification device included physically in the mobile phone; erasing all emails currently stored in the mobile phone; and all contacts currently stored in the mobile phone; after leaving the sub-geographic region labeled as the dangerous reception area by the user, entering the sub-sub-geographic region labeled as the safe reception area; detecting current location (step 230) (step 220) being the safe reception area by the location-identification device included physically in the mobile phone; and restoring the emails to the mobile phone; and the contacts to the mobile phone; and allowing the user to use the mobile phone with a complete set of email inbox and a complete set of contact list.

In addition, the mobile phone may be configured to comprise instructions comprising receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area.

In addition, the building may be labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area; receiving an answer from the user, (step 140) wherein the answer includes the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the building labeled as the very dangerous reception area by a third party unknown to the user, detecting current location (step 230) (step 220) being the very dangerous reception area by a location-identification device included physically in the mobile phone; alerting the carrier to report the third party entering the very dangerous reception area; requesting the carrier to determine whether all emails currently stored in the mobile phone should be erased permanently; and all contacts currently stored in the mobile phone should be erased permanently; if allowed by the carrier, erasing all emails currently stored in the mobile phone permanently; all contacts currently stored in the mobile phone permanently; all emails currently stored in the carrier permanently; and all contacts currently stored in the carrier permanently; after leaving the building labeled as the very dangerous reception area by the third party unknown to the user, detecting current location (step 230) (step 220) being the safe reception area by the location-identification device included physically in the mobile phone; and allowing the third party to use the mobile phone (step 240) with an empty set of email inbox and an empty set of contact list.

In another implementation, the mobile phone is configured to include instructions comprising receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; and a floor of the building.

Likewise, the floor may be labeled as a safe reception area; an embassy building that is within the geographic area, wherein the embassy building is labeled as an extreme dangerous reception area; and an open area within the embassy, wherein the open area is labeled as a safe reception area; receiving an answer from the user, (step 140) wherein the answer includes the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the building labeled as the very dangerous reception area by the user, detecting current location (step 230) (step 220) being the very dangerous reception area indirectly by the built-in GPS receiver included physically in the mobile phone and directly by GPS repeaters installed in the building; alerting the carrier to report the user entering the very dangerous reception area; requesting the carrier to determine whether all emails currently stored in the mobile phone should be erased temporarily; and all contacts currently stored in the mobile phone should be erased temporarily; if allowed by the carrier, erasing all emails currently stored in the mobile phone temporarily; all contacts currently stored in the mobile phone temporarily; all emails currently stored in the carrier temporarily; and all contacts currently stored in the carrier temporarily; after leaving the building labeled as the very dangerous reception area by the user, entering the floor of the building labeled as the safe reception area; detecting current location (step 230) (step 220) being the safe reception area indirectly by the built-in GPS receiver included physically in the mobile phone and directly by the GPS repeaters installed in the building; restoring all emails currently stored in the mobile phone; all contacts currently stored in the mobile phone; all emails currently stored in the carrier; all contacts currently stored in the carrier; and allowing the user to use the mobile phone with a complete set of email inbox and a complete set of contact list in the safe reception area.

In a further implementation, a mobile phone is provided. The mobile phone allows provisioning of a safety feature that operates totally independent of a carrier's control; a processor; and a memory storing instructions to be executed by the processor, wherein the instructions comprise receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; a floor of the building, wherein the floor is labeled as a safe reception area; an embassy building that is within the geographic area.

Here, the embassy building may be labeled as an extreme dangerous reception area; and an open area within the embassy, wherein the open area is labeled as a safe reception area; receiving an answer from the user, (step 140) wherein the answer includes the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the embassy labeled as the extreme dangerous reception area by a third party unknown to the user, detecting current location (step 230) (step 220) being the extreme dangerous reception area by a location-identification device included physically in the mobile phone; capturing a photo using a camera included in the mobile phone; alerting the carrier to report the third party entering the extreme dangerous reception area by providing the photo captured by the camera; requesting the carrier to determine whether all emails currently stored in the mobile phone should be erased permanently; all contacts currently stored in the mobile phone should be erased permanently; and destroying the mobile phone after erasing the emails and contacts by short-circuiting the mobile phone; if allowed by the carrier: erasing all emails currently stored in the mobile phone permanently; erasing all contacts currently stored in the mobile phone permanently; erasing all emails currently stored in the carrier permanently; erasing all contacts currently stored in the carrier permanently; and destroying the mobile phone after erasing the emails and contacts and short-circuiting the mobile phone to exterminate the phone; after leaving the embassy labeled as the extreme dangerous reception area by the third party unknown to the user, detecting current location (step 230) (step 220) being the safe reception area by the location-identification device included physically in the mobile phone; and prohibiting the third party to use the mobile phone that has been exterminated.

In yet another alternative, a mobile phone is provided to allow provisioning of a safety feature that operates totally independent of a carrier's control, comprising: a processor; and a memory storing instructions to be executed by the processor, wherein the instructions comprise: receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, through an electronic map produced by the mobile phone, to denote: a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area; receiving an answer from the user.

The answer, in one example, may include: the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the embassy labeled as the extreme dangerous reception area by the user, detecting current location (step 230) (step 220) being the extreme dangerous reception area by a location-identification device included physically in the mobile phone; alerting the carrier to report the user entering the extreme dangerous reception area by providing the photo captured by the camera; requesting the carrier to determine whether all emails currently stored in the mobile phone should be erased temporarily; all contacts currently stored in the mobile phone should be erased temporarily; and destroying the mobile phone after erasing the emails and contacts by short-circuiting the mobile phone temporarily; if allowed by the carrier: erasing all emails currently stored in the mobile phone temporarily; erasing all contacts currently stored in the mobile phone temporarily; erasing all emails currently stored in the carrier temporarily; erasing all contacts currently stored in the carrier temporarily; and disabling the mobile phone after erasing the emails and contacts and short-circuiting the mobile phone temporarily; after leaving the embassy labeled as the extreme dangerous reception area by the user, entering the open area of the embassy labeled as the safe reception area; detecting current location (step 230) (step 220) being the safe reception area by the location-identification device included physically in the mobile phone; restoring: all emails currently stored in the mobile phone; all contacts currently stored in the mobile phone; all emails currently stored in the carrier; and all contacts currently stored in the carrier; re-circuiting the mobile phone; and allowing the user to use the mobile phone with a complete set of email inbox and a complete set of contact list in the safe reception area.

A further mobile phone is disclosed that allows provisioning of a safety feature that operates totally independent of a carrier's control, comprising: a processor; and a memory storing instructions to be executed by the processor, wherein the instructions comprise: receiving an instruction from a user to enable a safety feature (step 110), wherein the user is an end user of a mobile phone whose network coverage from a phone carrier includes a geographic area such as a country or a state; disabling data connection with the carrier (step 120), for security reasons; requesting the user for information for enabling a safety feature (step 130) that allows the user, by referring to an electronic map produced by the mobile phone, to denote: a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area.

In another example, the building may be labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area; receiving an answer from the user, (step 140) wherein the answer includes: the sub-geographic region; the sub-sub-geographic region; the building; the floor of the building; the embassy; and the open area; enabling the safety feature in view of the received answer (step 150); re-enabling data connection with the carrier (step 210), after setting up the safety feature; after the mobile phone entering the sub-geographic region labeled as the dangerous reception area by the user, detecting current location (step 230) (step 220) being the dangerous reception area by a location-identification device included physically in the mobile phone; erasing: all emails currently stored in the mobile phone; and all contacts currently stored in the mobile phone; after leaving the sub-geographic region labeled as the dangerous reception area by the user, entering the sub-sub-geographic region labeled as the safe reception area; detecting current location (step 230) (step 220) being the safe reception area by the location-identification device included physically in the mobile phone; and restoring: the emails to the mobile phone; and the contacts to the mobile phone; allowing the user to use the mobile phone with a complete set of email inbox and a complete set of contact list; detecting that the mobile phone entering into the building labeled as the very dangerous reception area by the user indirectly by the built-in GPS receiver included physically in the mobile phone and directly by the GPS repeaters installed in the building; alerting the carrier to report the user entering the very dangerous reception area; requesting the carrier to determine whether all emails currently stored in the mobile phone should be erased temporarily; and all contacts currently stored in the mobile phone should be erased temporarily; if allowed by the carrier, erasing: all emails currently stored in the mobile phone temporarily; all contacts currently stored in the mobile phone temporarily; all emails currently stored in the carrier temporarily; and all contacts currently stored in the carrier temporarily; after leaving the building labeled as the very dangerous reception area by the user, entering the floor of the building labeled as the safe reception area; detecting current location (step 230) (step 220) being the safe reception area indirectly by the built-in GPS receiver included physically in the mobile phone and directly by the GPS repeaters installed in the building; restoring: all emails currently stored in the mobile phone; all contacts currently stored in the mobile phone; all emails currently stored in the carrier; all contacts currently stored in the carrier; and allowing the user to use the mobile phone with a complete set of email inbox and a complete set of contact list in the safe reception area; detecting the mobile phone being entered into the embassy labeled as the extreme dangerous reception area by the user indirectly by the built-in GPS receiver included physically in the mobile phone and directly by GPS receivers installed in the embassy; alerting the carrier to report the user entering the extreme dangerous reception area by providing the photo captured by the camera; requesting the carrier to determine whether all emails currently stored in the mobile phone should be erased temporarily; all contacts currently stored in the mobile phone should be erased temporarily; and destroying the mobile phone after erasing the emails and contacts by short-circuiting the mobile phone temporarily; if allowed by the carrier: erasing all emails currently stored in the mobile phone temporarily; erasing all contacts currently stored in the mobile phone temporarily; erasing all emails currently stored in the carrier temporarily; erasing all contacts currently stored in the carrier temporarily; and disabling the mobile phone after erasing the emails and contacts and short-circuiting the mobile phone temporarily; after leaving the embassy labeled as the extreme dangerous reception area by the user, entering the open area of the embassy labeled as the safe reception area; detecting current location (step 230) being the safe reception area by the location-identification device included physically in the mobile phone; restoring: all emails currently stored in the mobile phone; all contacts currently stored in the mobile phone; all emails currently stored in the carrier; and all contacts currently stored in the carrier; re-circuiting the mobile phone; and allowing the user to use the mobile phone with a complete set of email inbox and a complete set of contact list in the safe reception area.

The present techniques and embodiments described herein, including the exemplary phones presented above, can be implemented in digital electronic circuitry, or in computer hardware, firmware, software, or in any suitable combinations thereof. In addition, apparatus and systems consistent with the present invention can be implemented in a computer program product tangibly embodied in a machine-readable storage device for execution by a programmable processor.

Method steps according to embodiments of the invention can also be performed by a programmable processor executing a program of instructions to perform functions or steps of the methods by operating based on input data, and by generating output data. Embodiments of the invention may also be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, or in assembly or machine code. The language or code can be a compiled or interpreted language or code. Processors may include general and special purpose microprocessors. A processor receives instructions and data from memories, in particular from read-only memories or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in application-specific integrated circuits (ASICs).

To provide for interaction with a user, aspects of the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard pointing device and I/O interface.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Although illustrative embodiments have been described herein with reference to the accompanying drawings, it is noted that the invention is not limited to the precise system and method embodiments described herein, and that various other changes and modifications may be affected by one skilled in the art without departing from the scope or spirit of the invention. All such changes and modifications are intended to be included within the scope of the invention as defined by the appended claims.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

What is claimed is:

1. A mobile phone to allow provisioning of a safety feature that operates totally independent of a carrier's control, comprising: a processor; and a memory storing instructions to be executed by the processor, wherein the instructions comprise: receiving an instruction from a user to enable a safety feature, wherein the user is an end user of a mobile phone whose network coverage from a phone carrier includes a geographic area such as a country or a state; and in response to receiving the instruction, disabling data connection with the carrier, for security reasons; and requesting the user for information for enabling a safety feature that allows the user, through an electronic map produced by the mobile phone, to denote: a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area; a floor of the building, wherein the floor is labeled as a safe reception area; an embassy building that is within the geographic area, wherein the embassy building is labeled as an extreme dangerous reception area; and an open area within the embassy, wherein the open area is labeled as a safe reception area; receiving an answer from the user, wherein the answer includes: the sub-geographic region; the sub-sub-geographic region; the building; the floor of the building; the embassy; and the open area; and enabling the safety feature in view of the received answer.

2. The phone of claim 1, wherein the instructions further comprise:
 re-enabling data connection with the carrier, after setting up the safety feature;
 after the mobile phone entering the sub-geographic region labeled as the dangerous reception area by a third party unknown to the user, detecting current location being the dangerous reception area by a location-identification device included physically in the mobile phone;
 erasing:
  all emails currently stored in the mobile phone; and
  all contacts currently stored in the mobile phone;
 after leaving the sub-geographic region labeled as the dangerous reception area by the third party unknown to the user, detecting current location being the safe reception area by the location-identification device included physically in the mobile phone; and
 allowing the third party to use the mobile phone with an empty set of email inbox and an empty set of contact list.

3. The phone of claim 1, wherein the instructions further comprise
 re-enabling data connection with the carrier, after setting up the safety feature;
 after the mobile phone entering the sub-geographic region labeled as the dangerous reception area by the user, detecting current location being the dangerous reception area by a location-identification device included physically in the mobile phone;
 erasing:
  all emails currently stored in the mobile phone; and
  all contacts currently stored in the mobile phone;
 after leaving the sub-geographic region labeled as the dangerous reception area by the user, entering the sub-sub-geographic region labeled as the safe reception area;
 detecting current location being the safe reception area by the location-identification device included physically in the mobile phone; and
 restoring:
  the emails to the mobile phone; and
  the contacts to the mobile phone; and
 allowing the user to use the mobile phone with a complete set of email inbox and a complete set of contact list.

4. The phone of claim 1, wherein the instructions further comprise:
 re-enabling data connection with the carrier, after setting up the safety feature;
 after the mobile phone entering the building labeled as the very dangerous reception area by a third party unknown to the user, detecting current location being the very dangerous reception area by a location-identification device included physically in the mobile phone;
 alerting the carrier to report the third party entering the very dangerous reception area;
 requesting the carrier to determine whether
  all emails currently stored in the mobile phone should be erased permanently; and
  all contacts currently stored in the mobile phone should be erased permanently;
 if allowed by the carrier, erasing:
  all emails currently stored in the mobile phone permanently;
  all contacts currently stored in the mobile phone permanently;
  all emails currently stored in the carrier permanently; and
  all contacts currently stored in the carrier permanently;
 after leaving the building labeled as the very dangerous reception area by the third party unknown to the user, detecting current location being the safe reception area by the location-identification device included physically in the mobile phone; and
 allowing the third party to use the mobile phone with an empty set of email inbox and an empty set of contact list.

5. The phone of claim 1, wherein a built-in GPS receiver if further included and the instructions further comprise:
 re-enabling data connection with the carrier, after setting up the safety feature;
 after the mobile phone entering the building labeled as the very dangerous reception area by the user, detecting current location being the very dangerous reception area indirectly by the built-in GPS receiver included physically in the mobile phone and directly by GPS repeaters installed in the building;
 alerting the carrier to report the user entering the very dangerous reception area;
 requesting the carrier to determine whether
  all emails currently stored in the mobile phone should be erased temporarily; and
  all contacts currently stored in the mobile phone should be erased temporarily;
 if allowed by the carrier, erasing:
  all emails currently stored in the mobile phone temporarily;
  all contacts currently stored in the mobile phone temporarily;
  all emails currently stored in the carrier temporarily; and
  all contacts currently stored in the carrier temporarily;
 after leaving the building labeled as the very dangerous reception area by the user, entering the floor of the building labeled as the safe reception area;
 detecting current location being the safe reception area indirectly by the built-in GPS receiver included physically in the mobile phone and directly by the GPS repeaters installed in the building;
 restoring:
  all emails currently stored in the mobile phone;
  all contacts currently stored in the mobile phone;
  all emails currently stored in the carrier;
  all contacts currently stored in the carrier; and allowing the user to use the mobile phone with a complete set of email inbox and a complete set of contact list in the safe reception area.

6. The phone of claim 1, wherein the instructions further comprise:
re-enabling data connection with the carrier, after setting up the safety feature;
after the mobile phone entering the embassy labeled as the extreme dangerous reception area by a third party unknown to the user, detecting current location being the extreme dangerous reception area by a location-identification device included physically in the mobile phone;
capturing a photo using a camera included in the mobile phone;
alerting the carrier to report the third party entering the extreme dangerous reception area by providing the photo captured by the camera;
requesting the carrier to determine whether
all emails currently stored in the mobile phone should be erased permanently;
all contacts currently stored in the mobile phone should be erased permanently; and
destroying the mobile phone after erasing the emails and contacts by short-circuiting the mobile phone;
if allowed by the carrier:
erasing all emails currently stored in the mobile phone permanently;
erasing all contacts currently stored in the mobile phone permanently;
erasing all emails currently stored in the carrier permanently;
erasing all contacts currently stored in the carrier permanently; and
destroying the mobile phone after erasing the emails and contacts and short-circuiting the mobile phone to exterminate the phone;
after leaving the embassy labeled as the extreme dangerous reception area by the third party unknown to the user, detecting current location being the safe reception area by the location-identification device included physically in the mobile phone; and
prohibiting the third party to use the mobile phone that has been exterminated.

7. The phone of claim 1, wherein the instructions further comprise:
re-enabling data connection with the carrier, after setting up the safety feature;
after the mobile phone entering the embassy labeled as the extreme dangerous reception area by the user, detecting current location being the extreme dangerous reception area by a location-identification device included physically in the mobile phone;
alerting the carrier to report the user entering the extreme dangerous reception area by providing the photo captured by the camera;
requesting the carrier to determine whether
all emails currently stored in the mobile phone should be erased temporarily;
all contacts currently stored in the mobile phone should be erased temporarily; and
destroying the mobile phone after erasing the emails and contacts by short-circuiting the mobile phone temporarily;
if allowed by the carrier:
erasing all emails currently stored in the mobile phone temporarily;
erasing all contacts currently stored in the mobile phone temporarily;
erasing all emails currently stored in the carrier temporarily;
erasing all contacts currently stored in the carrier temporarily; and
disabling the mobile phone after erasing the emails and contacts and short-circuiting the mobile phone temporarily;
after leaving the embassy labeled as the extreme dangerous reception area by the user, entering the open area of the embassy labeled as the safe reception area;
detecting current location being the safe reception area by the location-identification device included physically in the mobile phone;
restoring:
all emails currently stored in the mobile phone;
all contacts currently stored in the mobile phone;
all emails currently stored in the carrier; and
all contacts currently stored in the carrier;
re-circuiting the mobile phone; and
allowing the user to use the mobile phone with a complete set of email inbox and a complete set of contact list in the safe reception area.

8. A mobile phone to allow provisioning of a safety feature that operates totally independent of a carrier's control, comprising: a processor; and a memory storing instructions to be executed by the processor, wherein the instructions comprise: receiving an instruction from a user to enable a safety feature, wherein the user is an end user of a mobile phone whose network coverage from a phone carrier includes a geographic area such as a country or a state; and in response to receiving the instruction, disabling data connection with the carrier, for security reasons; and requesting the user for information for enabling a safety feature that allows the user, by referring to an electronic map produced by the mobile phone, to denote: a sub-geographic region that is a smaller region within the geographic area, wherein the sub-geographic region is labeled as a dangerous reception area; a sub-sub-geographic region that is a smaller region within the sub-geographic area, wherein the sub-sub-geographic region is labeled as a safe reception area; a building that is within the geographic area, wherein the building is labeled as a very dangerous reception area;
a floor of the building, wherein the floor is labeled as a safe reception area;
an embassy building that is within the geographic area, wherein the embassy building is labeled as an extreme dangerous reception area; and an open area within the embassy, wherein the open area is labeled as a safe reception area; receiving an answer from the user, wherein the answer includes: the sub-geographic region; the sub-sub-geographic region; the building; the floor of the building; the embassy; and the open area; enabling the safety feature in view of the received answer; re-enabling data connection with the carrier, after setting up the safety feature; after the mobile phone entering the sub-geographic region labeled as the dangerous reception area by the user, detecting current location being the dangerous reception area by a location-identification device included physically in the mobile phone; erasing: all emails currently stored in the mobile phone; and all contacts currently stored in the mobile phone; after leaving the sub-geographic region labeled as the dangerous reception area by the user, entering the sub-sub-geographic region labeled as the safe reception area; detecting current location being the safe reception area by the location-identification device included physically in the mobile phone; and restoring: the emails to the mobile phone; and
the contacts to the mobile phone; allowing the user to use the mobile phone with a complete set of email inbox and a complete set of contact list; detecting that the mobile phone entering into the building labeled as the very dangerous reception area by the user indirectly by a built-in GPS receiver included physically in the mobile phone and directly by GPS repeaters installed in the building; alerting the carrier to report the user entering the very dangerous reception area; requesting the carrier to determine whether all emails currently stored in the mobile phone should be erased temporarily; and all contacts currently stored in the mobile phone should be erased temporarily;
if allowed by the carrier, erasing: all emails currently stored in the mobile phone temporarily; all contacts currently stored in the mobile phone temporarily; all emails currently stored in the carrier temporarily; and all contacts currently stored in the carrier temporarily; after leaving the building labeled as the very dangerous reception area by the user, entering the floor of the building labeled as the safe reception area; detecting current location being the safe reception area indirectly by the built-in GPS receiver included physically in the mobile phone and directly by the GPS repeaters installed in the building; restoring: all emails currently stored in the mobile phone; all contacts currently stored in the mobile phone; all emails currently stored in the carrier; all contacts currently stored in the carrier; and allowing the user to use the mobile phone with a complete set of email inbox and a complete set of contact list in the safe reception area; detecting the mobile phone being entered into the embassy labeled as the extreme dangerous reception area by the user indirectly by the built-in GPS receiver included physically in the mobile phone and directly by GPS receivers installed in the embassy; alerting the carrier to report the user entering the extreme dangerous reception area by providing a photo captured by a camera;
requesting the carrier to determine whether all emails currently stored in the mobile phone should be erased temporarily; all contacts currently stored in the mobile phone should be erased temporarily; and destroying the mobile phone after erasing the emails and contacts by short-circuiting the mobile phone temporarily; if allowed by the carrier: erasing all emails currently stored in the mobile phone temporarily; erasing all contacts currently stored in the mobile phone temporarily; erasing all emails currently stored in the carrier temporarily; erasing all contacts currently stored in the carrier temporarily; and disabling the mobile phone after erasing the emails and contacts and short-circuiting the mobile phone temporarily; after leaving the embassy labeled as the extreme dangerous reception area by the user, entering the open area of the embassy labeled as the safe reception area; detecting current location being the safe reception area by the location-identification device included physically in the mobile phone;
restoring: all emails currently stored in the mobile phone; all contacts currently stored in the mobile phone; all emails currently stored in the carrier; and all contacts currently stored in the carrier; re-circuiting the mobile phone; and allowing the user to use the mobile phone with a complete set of email inbox and a complete set of contact list in the safe reception area.

\* \* \* \* \*